(12) United States Patent
Ichimaru

(10) Patent No.: US 6,890,165 B2
(45) Date of Patent: May 10, 2005

(54) TIRE CATCHING DEVICE OF POST-VULCANIZATION INFLATING DEVICE

(75) Inventor: Hironobu Ichimaru, Chikugo (JP)

(73) Assignee: Ichimaru Giken Co., Ltd., Fukuoka (JP)

( * ) Notice: Subject to any disclaimer, the term of this patent is extended or adjusted under 35 U.S.C. 154(b) by 165 days.

(21) Appl. No.: 10/416,684

(22) PCT Filed: Jan. 9, 2001

(86) PCT No.: PCT/JP01/00052

§ 371 (c)(1),
(2), (4) Date: May 9, 2003

(87) PCT Pub. No.: WO02/055278

PCT Pub. Date: Jul. 18, 2002

(65) Prior Publication Data

US 2004/0013755 A1 Jan. 22, 2004

(51) Int. Cl.[7] .............................................. B29C 35/16
(52) U.S. Cl. ...................................... 425/58.1; 425/38
(58) Field of Search .................................. 425/38, 58.1

(56) References Cited

U.S. PATENT DOCUMENTS 4,092,090 A    5/1978   Yuhas et al.
5,206,031 A  * 4/1993   Siegenthaler .............. 425/58.1

FOREIGN PATENT DOCUMENTS

JP           2001-30256           2/2001

* cited by examiner

Primary Examiner—James P. Mackey
(74) Attorney, Agent, or Firm—Flynn, Thiel, Boutell & Tanis, PC

(57) ABSTRACT

When the loading device or the unloading device is transferred, a procedure for separating the attaching/detaching-side rim mold to separate both the rim molds is eliminated, and the loading procedure and unloading procedure are simplified correspondingly, and the operation efficiency is enhanced. The present invention provides a tire grasping device of a PCI device in which a stroke amount when separating or coupling the attaching/detaching-side rim mold from and to the body-side rim mold is reduced to such a degree that the grasped tire does not interfere with the body-side rim mold and thus, the device is reduced in size.

A post-vulcanization inflating device comprises a body-side rim mold 2 and an attaching/detaching-side rim mold 3. Both the rim molds are formed with bead receiving surfaces 21, 31 opposed to an outer surface of a bead portion of a post-vulcanized tire T1, the post-vulcanized tire is cooled and its shape is stabilized in a state in which the post-vulcanized tire is held between the bead receiving surfaces. The attaching/detaching-side rim mold is provided with an engaging pawl 40 for detachably grasping the bead portion of the tire.

1 Claim, 6 Drawing Sheets

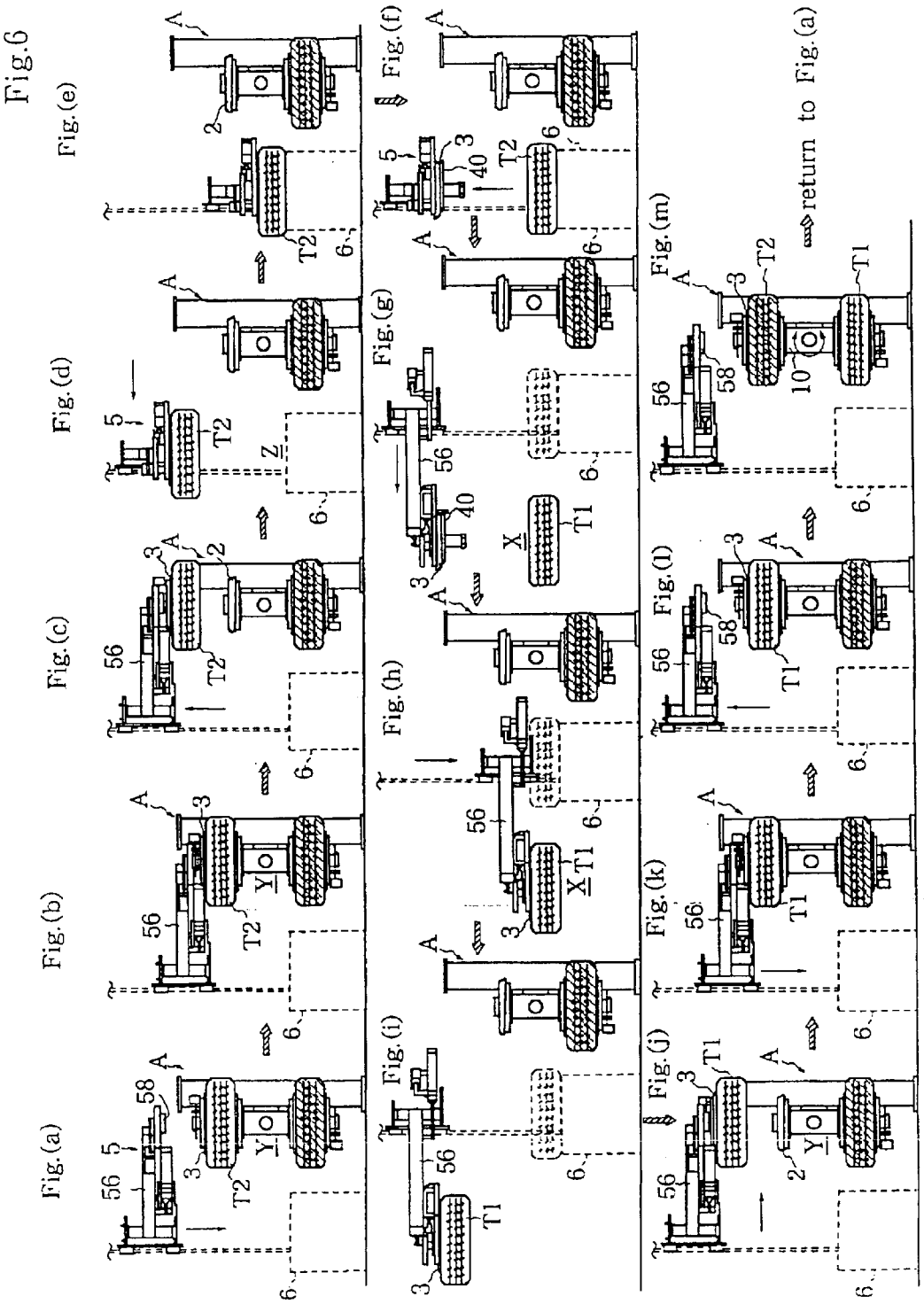

TIRE CATCHING DEVICE OF POST-VULCANIZATION INFLATING DEVICE

FIELD OF ART

The present invention relates to a catching device of post-vulcanization inflating device used when a postcured tire cured by a tire curing device is loaded to post-vulcanization inflating device (PCI device, hereinafter) or a cooled tire processed by the PCI device is unloaded.

BACKGROUND OF THE INVENTION

In a tire forming procedure, a post-vulcanized tire immediately after vulcanized by a tire-vulcanizing device is hot and soft and thus is deformed by its own weight.

Thereupon, using the PCI device, the vulcanized tire is held in a state closer to a wheel mount state by a body-side rim mold and an attaching/detaching-side rim mold, and compressed air is supplied into the tire to hold a shape of the tire, and the tire is cooled in this state to stabilize its shape.

When the post-vulcanized tire is loaded to the PCI device, a loading device that reciprocates between the PCI device and the tire-vulcanizing device is used. When a cooled tire is unloaded from the PCI device, an unloading device that reciprocates between the PCI device and a tire discharging position is used.

In the PCI device, a tire is held in a state closer to the wheel mount state by the body-side mold and the attaching/detaching-side rim mold. When the tire is loaded and unloaded, it is necessary that the attaching/detaching-side rim mold is separated from the body-side rim mold, thereby separating both the rim molds, the loading device is transferred between both the molds, the post-vulcanized tire is placed on the body-side rim mold, or the unloading device is transferred between the molds, and the cooled tire is unloaded from the body-side rim mold.

In the case of the conventional technique, however, when the loading device or the unloading device is transferred between the body-side rim mold and the attaching/detaching-side rim mold, it is necessary to largely stroke (hoist) the attaching/detaching-side rim mold so that the loading device or the unloading device does not interfere the attaching/detaching-side rim mold, and the PCI device is increased in size correspondingly, and the producing cost is also increased.

A separating action of the attaching/detaching-side rim mold is carried out only for separating both the rim molds for the sake of preventing the interfere when the loading device or the unloading device is transferred between both the rim molds. Therefore, there is a problem that since the separating procedure of the attaching/detaching-side rim mold is added, the loading procedure of the postcured tire and the unloading procedure of the cooled tire are increased and complicated correspondingly, and the operation efficiency can not be enhanced.

The present invention has been accomplished to solve the above-described conventional problem, and the invention makes it possible to load a tire by the loading device and to unload a tire by the unloading device in a state in which the tire is grasped by the attaching/detaching-side rim mold by assembling a tire catching device to the attaching/detaching-side rim mold.

With this, when the loading device or the unloading device is transferred, a procedure for separating the attaching/detaching-side rim mold to separate both the rim molds is eliminated, and the loading procedure and unloading procedure are simplified correspondingly, and the operation efficiency is enhanced.

It is an object of the invention to provide a tire catching device of a PCI device in which a stroke amount when separating or coupling the attaching/detaching-side rim mold from and to the body-side rim mold is reduced to such a degree that the caught tire does not interfere with the body-side rim mold so that the device is reduced in size.

DISCLOSURE OF THE INVENTION

To solve the problem, a tire catching device of a PCI device of the present invention comprises a body-side rim mold and an attaching/detaching-side rim mold, both the rim molds are formed with bead receiving surfaces opposed to an outer surface of a bead portion of a post-vulcanized tire, the post-vulcanized tire is cooled and its shape is stabilized in a state in which the post-vulcanized tire is held between the bead receiving surfaces, the attaching/detaching-side rim mold is provided with an engaging pawl for detachably catching the bead portion of the tire.

That is, this invention is characterized in that the engaging pawl for detachably grasping a tire (post-vulcanized tire or cooled tire) is assembled into the attaching/detaching-side rim mold.

First, a procedure for loading the post-vulcanized tire from a tire-vulcanizing device to the PCI device by a loading device using the PCI device having the tire-catching device will be explained.

In a state in which the attaching/detaching-side rim mold is coupled to the loading device, the attaching/detaching-side rim mold is moved toward the tire-vulcanizing device, where the post-vulcanized tire is caught by the engaging pawl provided on the attaching/detaching-side rim mold and held in the attaching/detaching-side rim mold. Next, the loading device is moved to the PCI device in this state, and the attaching/detaching-side rim mold is coupled to the body-side rim mold. At that time, since the post-vulcanized tire is held in the attaching/detaching-side rim mold, the post-vulcanized tire can be held between both the rim molds while coupling the attaching/detaching-side rim mold to the body-side rim mold at the same time.

By assembling the tire-catching device to the attaching/detaching-side rim mold in this manner, the tire can be loaded to the loading device in a state in which the tire is grasped by the attaching/detaching-side rim mold.

Therefore, when the loading device is transferred to the PCI device, a conventional procedure for separating the attaching/detaching-side rim mold to separate both the rim molds is eliminated, and the loading procedure is simplified correspondingly, and the operation efficiency is enhanced.

Further, a stroke amount when coupling the attaching/detaching-side rim mold to the body-side rim mold is reduced to such a degree that the caught tire does not interfere with the body-side rim mold and thus, the loading device is reduced in size.

Next, a procedure for unloading the cooled tire from the PCI device by the unloading device using the PCI device having the tire-grasping device will be explained.

The post cured tire loaded to the PCI device by the loading device is cooled in a state in which the post-vulcanized tire is held by the body-side rim mold and the attaching/detaching-side rim mold.

When the cooled tire is unloaded, the unloading device is coupled to the attaching/detaching-side rim mold, and the cooled tire is grasped by the engaging pawl provided on the attaching/detaching-side rim mold and held by the attaching/detaching-side rim mold. Next, coupling of both the rim molds is released and then, the attaching/detaching-side rim mold is moved to a tire discharging position together with the cooled tire by the unloading device. Then, the catching of the cooled tire by the engaging pawl is released, and the cooled tire is lowered to a predetermined position.

By assembling the tire-grasping device into the attaching/detaching-side rim mold in this manner, the tire can be unloaded by the unloading device in a state in which the tire is caught by the attaching/detaching-side rim mold.

Therefore, when the unloading device is transferred to the PCI device, the conventional procedure for separating the attaching/detaching-side rim mold to separate both the rim molds is eliminated, and the unloading procedure is simplified correspondingly, and the operation efficiency is enhanced.

Further, a stroke amount when separating the attaching/detaching-side rim mold from the body-side rim mold is reduced to such a degree that the catght cooled tire does not interfere with the body-side rim mold and thus when the tire is transferred out from the PCI device, the unloading device is reduced in size.

BRIEF DESCRIPTION OF FIGURES

FIG. 6 is an explanatory view of a tire loading and unloading procedure of the PCI device.

BEST MODE FOR EMBODIMENT OF THE INVENTION

An embodiment of the present invention will be explained below with reference to the drawings.

Figure 1:
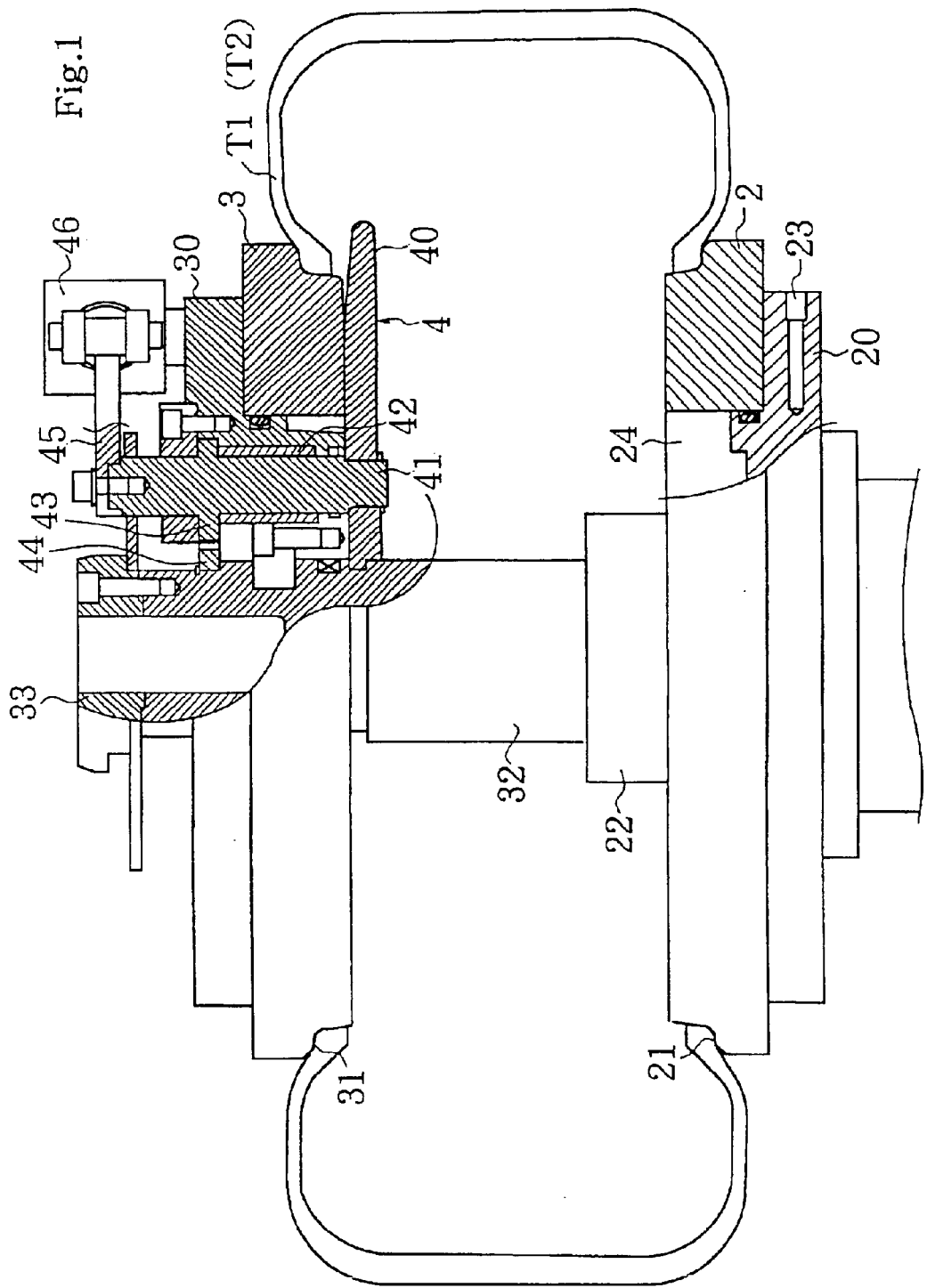
FIG. 1 shows one embodiment of the present invention, and is partially cut away view showing an essential portion of a PCI device into which a tire-grasping device is assembled.
Figure 2:
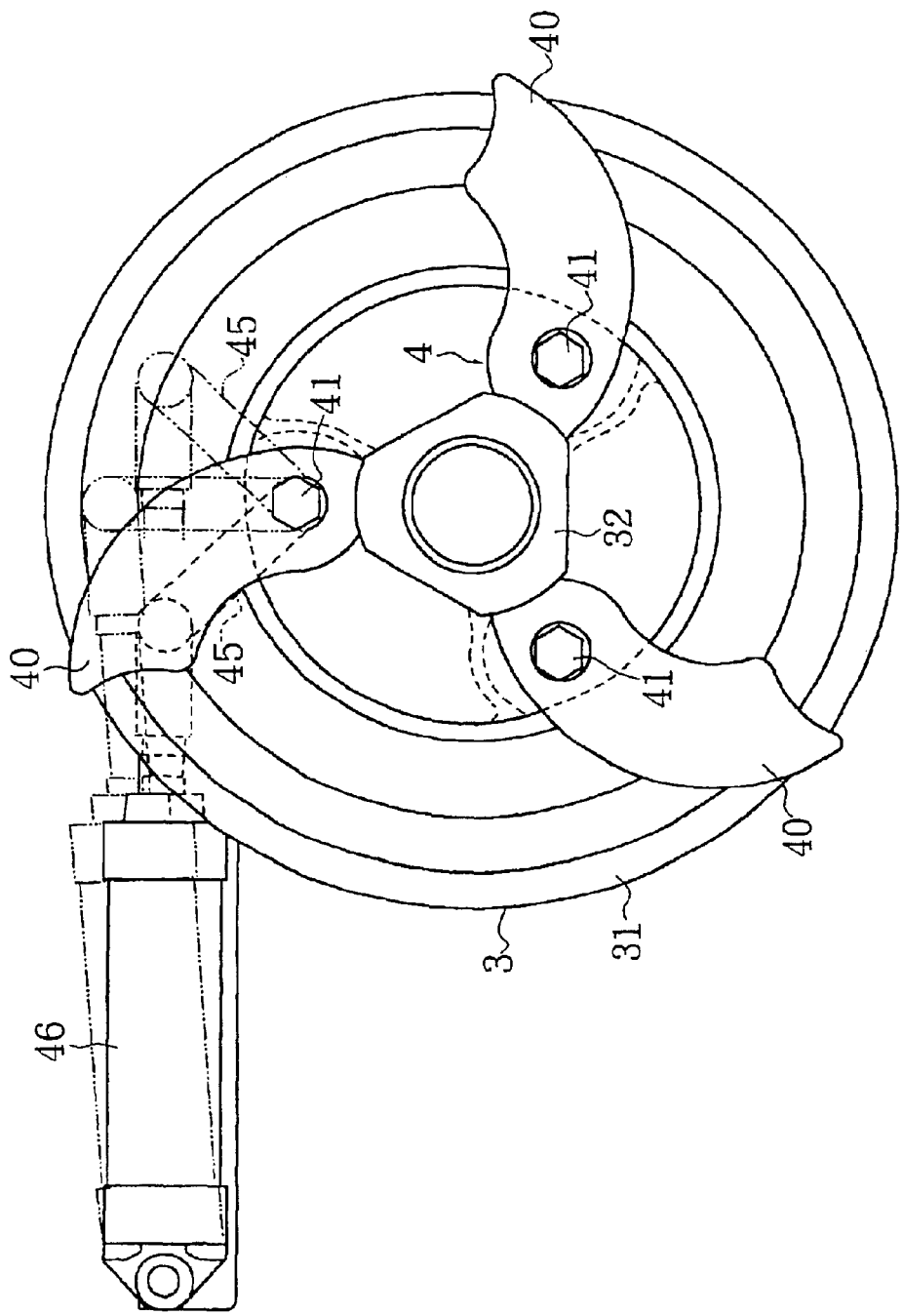
FIG. 2 is a bottom view of FIG. 1.
Figure 3:
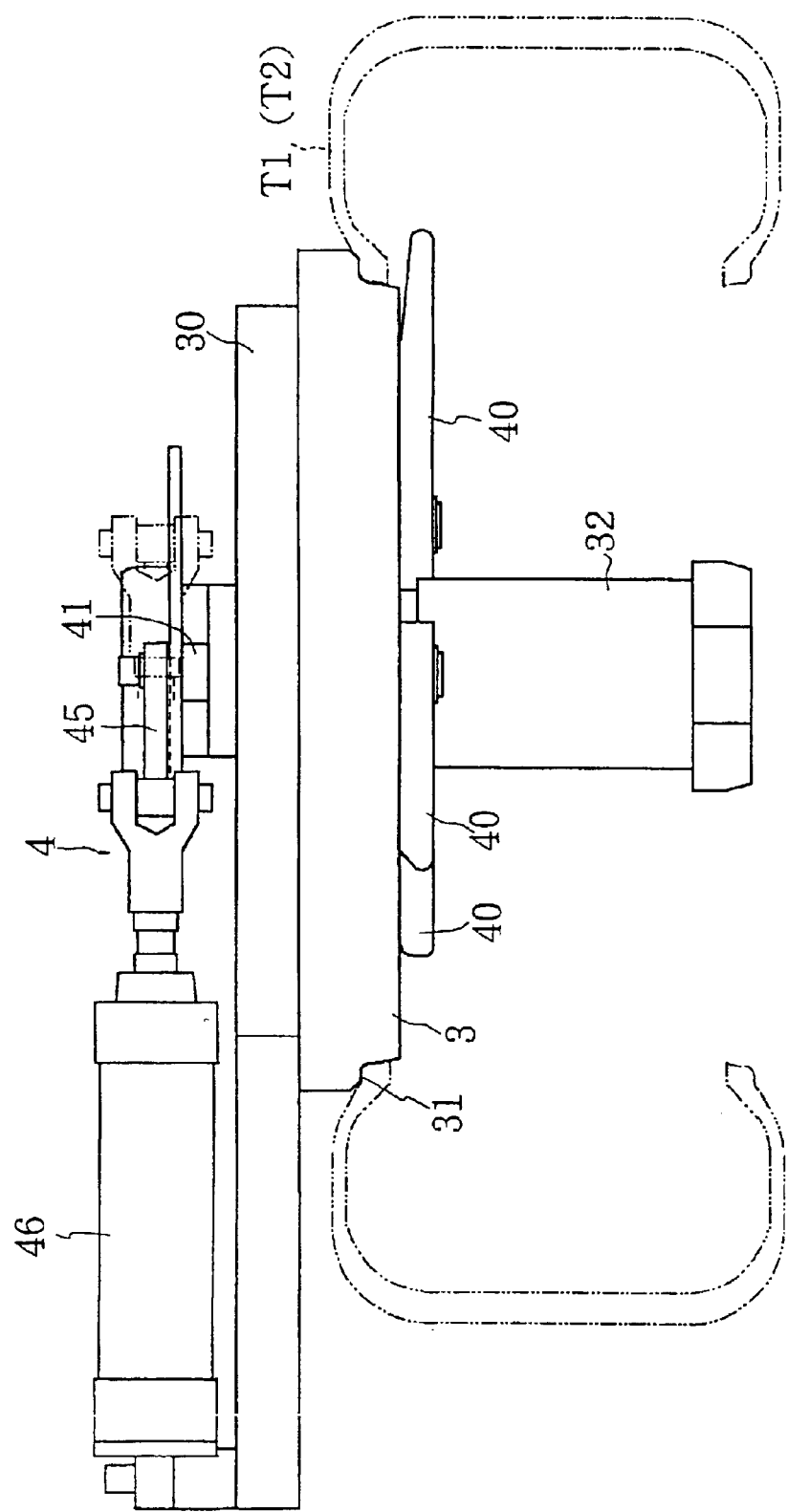
FIG. 3 is a side view of FIG. 1.
Figure 4:
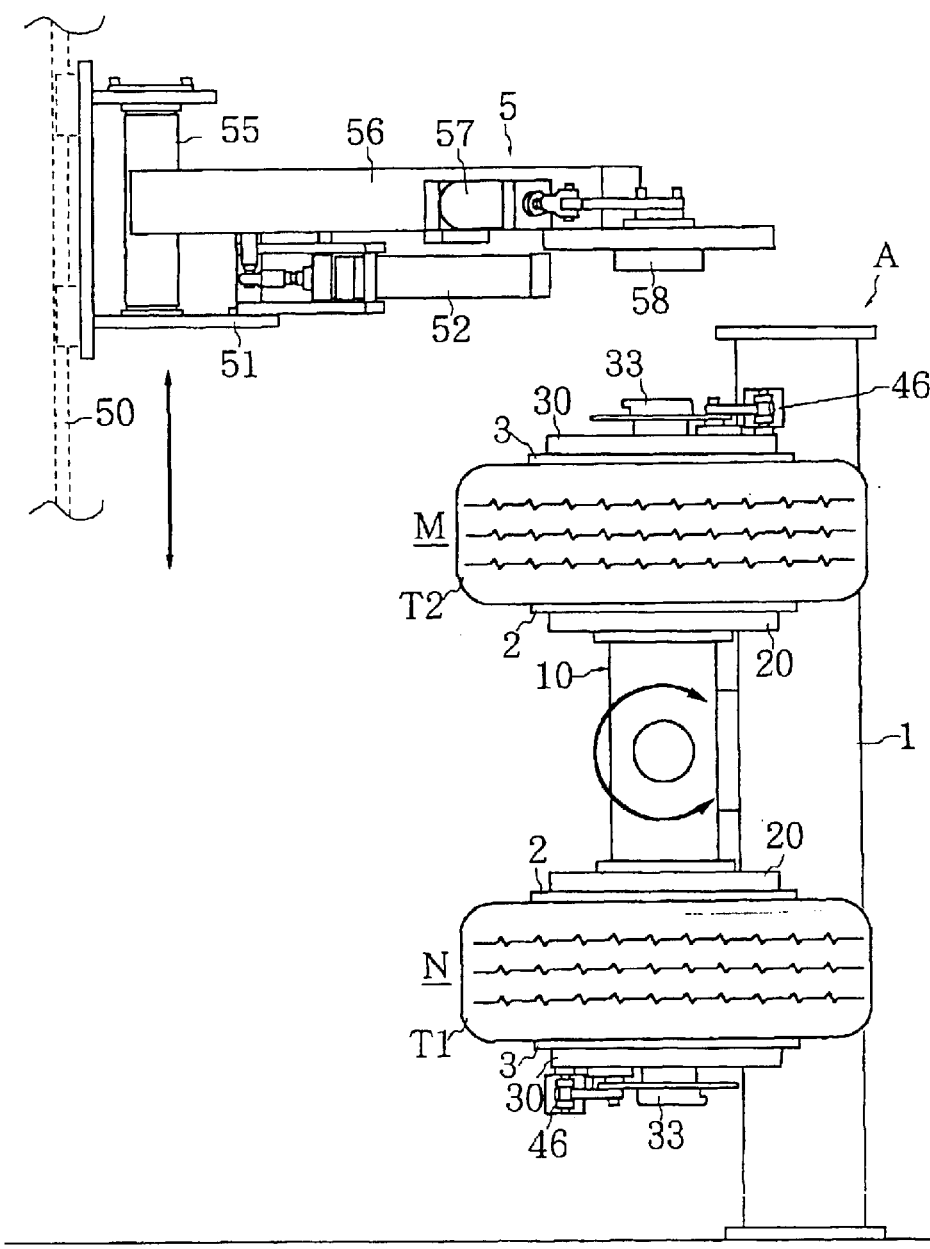
FIG. 4 is a side view showing the entire PCI device.
Figure 5:
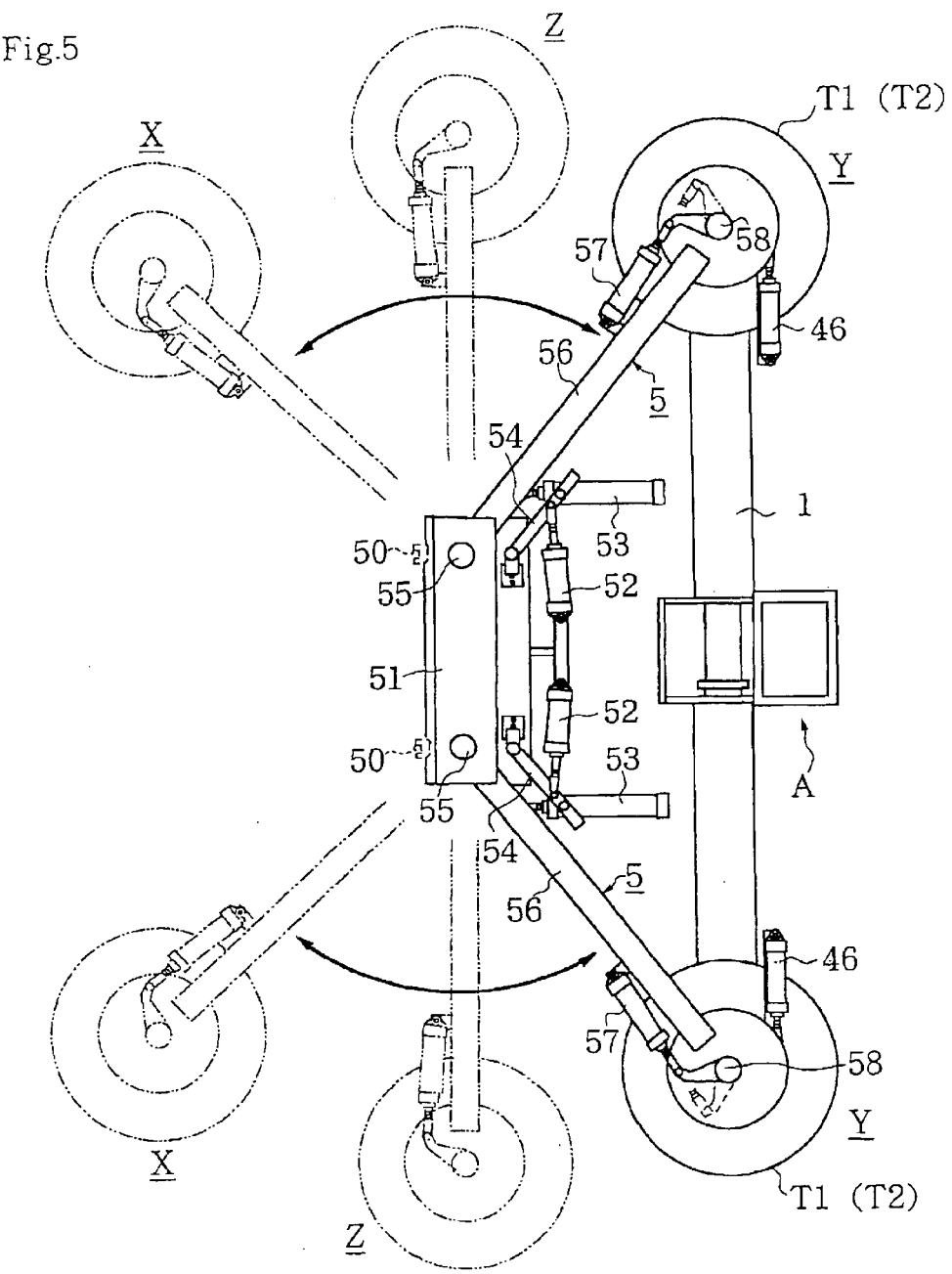
FIG. 5 is a plan view of the entire PCI device.

FIG. 1 shows one embodiment of the present invention, and is partially cut away view showing an essential portion of a PCI device into which a tire-catching device is assembled, FIG. 2 is a bottom view of FIG. 1, FIG. 3 is a side view of FIG. 1, FIG. 4 is a side view showing the entire PCI device, and FIG. 5 is a plan view of the entire PCI device.

In FIG. 4, a reference number 1 represents a main frame of a PCI device A. The main frame is provided with a turntable 10 whose upper end is a tire-exchanging position M and whose lower end is a tire-cooling position N. The turntable 10 can be turned upside down.

As shown in FIG. 1, body-side rim molds 2 are mounted to opposite ends of the turntable 10 through body flanges 20.

The body-side rim mold 2 is provided at its outer peripheral edge of its outer surface with a bead receiving surface 21 opposed to an outer surface of a bead portion of the post-vulcanized tire T1. A bayonet 22 formed with a coupling hole (not shown) is mounted to a central portion of the outer surface of the body-side rim mold 2. A reference number 23 represents an inflating port that is communicated with an air port 24 formed in the body side rim mold 2.

An attaching/detaching-side rim mold 3 is detachably coupled to the body-side rim mold 2 such that the mold 3 is opposed to the mold 2. An upper flange 30 is mounted to the attaching/detaching-side rim mold 3. An outer peripheral edge of the attaching/detaching-side rim mold 3 is formed with a bead receiving surface 31 opposed to the bead portion outer surface of the post-vulcanized tire T1. A bayonet plug 32, which is detachably, coupled to the coupling hole of the bayonet 22 projects from a central portion of the attaching/detaching-side rim mold 3.

A clutch plate 33 is mounted to a central portion of an upper surface of the upper flange 30, and a later-described tire loading/unloading device 5 is detachably coupled to the clutch plate 33.

A tire-catching device 4 is assembled into the upper flange 30. The tire-grasping device 4 is provided three (preferably a plurality of, two, four and the like) engaging pawls 40 for detachably grasping the bead portion of the tire (post-vulcanized tire T1 or cooled tire T2) between the engaging pawls 40 and the bead-receiving surface 31 of the attaching/detaching-side rim mold 3.

As shown in FIG. 2, each of the engaging pawls 40 is formed by curving a plate into a substantially falcate shape. The engaging pawls 40 are arranged on a lower surface of the attaching/detaching-side rim mold 3 at equal distances from one another. The engaging pawls 40 are constituted such that when they are closed, they do not hinder coming and going motion of a tire, and when they are opened, they can be brought into sufficient contact with the bead of the tire.

As shown in FIG. 1, each of the engaging pawls 40 is mounted in such a manner that a driving shaft 41 of each the engaging pawl is supported by a bearing 42 such as to pass through the upper flange 30 in the vertical direction, and the engaging pawl 40 is fixed to a lower end of the passing-through end of the driving shaft 41, an intermediate portion of the driving shaft 41 is formed with a gear portion 43, a gear 44 meshing with the gear portion 43 is loosely fitted to a base end of the bayonet plug 32, and a pawl-driving cylinder 46 is connected to an upper end of one of the driving shafts 41 through a lever 45.

Therefore, if the pawl-driving cylinder 46 is allowed to advance or retreat, the engaging pawls 40 are simultaneously rotated around the driving shafts 41 in association with the gear portion 43 and the gear 44, and the engaging pawls 40 advance and retreat between a retreated position (shown with dotted lines in FIG. 2) which is retreated inward of the bead receiving surface 31 and a advanced position (shown with solid lines in FIG. 2) which projects beyond the bead receiving surface 31.

By advancing the engaging pawl 40 in this manner, it is possible to grasp the bead portion of the tire, and by retreating the engaging pawl 40, its weight is released, and the attaching and detaching operation of the attaching/detaching-side rim mold 3 with respect to the body-side rim mold 2 is not hindered.

In FIGS. 4 and 5, a reference number 5 represents a tire loading/unloading device. The tire loading/unloading device 5 includes a function for loading the post-vulcanized tire T1 vulcanized by the tire vulcanizing device (not shown) to the PCI device A, and a function for unloading the cooled tire T2 cooled by the PCI device A to a discharging position.

The tire loading/unloading device 5 comprises a hoisting and lowering stage 51 hoisted and lowered along a vertical frame 50. The hoisting and lowering stage 51 is provided with two cylinders 52, 53, and a rotating arm 56 rotated around a base shaft 55 by an arm rink 54. The rotating arm 56 is provided at its tip end with a coupling portion 58 operated by a cylinder 57.

In this case, the rotating arm 56 can rotate, in a reciprocating manner, between a tire set position X of the tire vulcanizing device and a tire set position Y of the PCI device A, and can stop at each of the tire set positions X and Y, and at a tire discharging position Z located at an intermediate portion between the positions X and Y.

The coupling portion 58 is detachably coupled to the clutch plate 33 provided on the upper flange 30 by operation of the cylinder 57. In its coupled state, if the cylinder 57 is operated, the attaching/detaching-side rim mold 3 and the body-side rim mold 2 can be detachably coupled to each other.

Next, a tire loading and unloading procedure of the PCI device will be explained with reference to FIG. 6.

First, the rotating arm 56 which is in the tire set position Y (FIG. 6-a) of the PCI device A is lowered, and the attaching/detaching-side rim mold 3 is coupled to a tip end of the rotating arm 56 (FIG. 6-b). In this state, the engaging pawls 40 are allowed to project to catch the cooled tire T2. Next, the coupling state between the attaching/detaching-side rim mold 3 and the body-side rim mold 2 is released and then, the rotating arm 56 is hoisted together with the attaching/detaching-side rim mold 3 which keeps holding the cooled tire T2 (FIG. 6-c), and the tire is moved to the tire discharging position Z (FIG. 6-d). The rotating arm 56 is lowered onto a discharging stage 6 and then, the engaging pawls 40 are retreated to unload the cooled tire T2 from the attaching/detaching-side rim mold 3 (FIG. 6-e). This is the unloading procedure of the cooled tire T2 from the PCI device A.

By assembling the tire-catching device 4 into the attaching/detaching-side rim mold 3 in this manner, it is possible to unload the cooled tire T2 while grasping the tire by the attaching/detaching-side rim mold 3.

Therefore, when the rotating arm 56 is transferred from the PCI device A, the conventional procedure for separating the attaching/detaching-side rim mold 3 to separate both the rim molds 2 and 3 from each other is eliminated, and the unloading procedure is simplified correspondingly, and the operation efficiency is enhanced.

Further, a hoisting stroke amount when releasing the coupling between the attaching/detaching-side rim mold 3 and the body-side rim mold 2 is reduced to such a degree that the grasped cooled tire T2 does not interfere with the body-side rim mold 2 when the grasped cooled tire T2 is transferred from the PCI device A. Therefore, the tire loading/unloading device 5 can be reduced in size.

After the cooled tire T2 is unloaded onto the discharging stage 6 in this manner, the rotating arm 56 is hoisted while keeping the coupling state of the attaching/detaching-side rim mold 3 (FIG. 6-f). Next, the rotating arm 56 is moved to the tire set position X of the tire vulcanizing device (FIG. 6-g) and then, the rotating arm 56 is lowered, the engaging pawls 40 provided on the attaching/detaching-side rim mold 3 are allowed to project to catch the post-vulcanized tire T1 (FIG. 6-h). Next, the rotating arm 56 is hoisted (FIG. 6-i) together with the attaching/detaching-side rim mold 3 which still holds the post-vulcanized tire T1, and the post-vulcanized tire T1 is moved to the tire set position Y of the PCI device A (FIG. 6-j). The rotating arm 56 is lowered; the attaching/detaching-side rim mold 3 and the body-side rim mold 2 are coupled to each other, and the post-vulcanized tire T1 is held between both the rim molds 2 and 3 (FIG. 6-k). Next, the coupling between the attaching/detaching-side rim mold 3 and the rotating arm 56 is released, and the rotating arm 56 is allowed to hoist (FIG. 6-1). This is the loading procedure of the post-vulcanized tire T1 from the tire-vulcanizing device to the PCI device A.

By assembling the tire grasping device 4 into the attaching/detaching-side rim mold 3 in this manner, it is possible to load the post-vulcanized tire T1 while catching the post-vulcanized tire T1 by the attaching/detaching-side rim mold 3.

Therefore, when the rotating arm 56 is transferred to the PCI device A, the conventional procedure for separating the attaching/detaching-side rim mold 3 to separate both the rim molds 2 and 3 from each other is eliminated, and the loading procedure is simplified correspondingly, and the operation efficiency is enhanced.

Further, the lowering stroke amount when coupling the attaching/detaching-side rim mold 3 and the body-side rim mold 3 is reduced to such a degree that the caught tire does not interfere with the body-side rim mold 2 when the caught post-vulcanized tire T1 is transferred to the PCI device A and thus, the tire loading/unloading device 5 is reduced in size.

After the post-vulcanized tire T1 is loaded to the PCI device A in the above-described manner, the turntable 10 is turned upside down (FIG. 6-m), the post-vulcanized tire T1 loaded to the PCI device A at the current time is turned to the tire-cooling position N and is cooled there, and a cooled tire T2 which was previously cooled in the tire-cooling position N is turned to the tire-exchanging position M, and the cooled tire T2 is unloaded in accordance with the above-described procedure, and a post-vulcanized tire T1 is loaded to the PCI device A.

The one embodiment of the present invention has been explained above, a concrete structure of the invention is not limited to the embodiment.

For example, the engaging pawls advance and retreat by rotation in this embodiment, but engaging pawls, which radially expand and shrink, can also be used.

Further, the tire loading/unloading device has the function for loading a postcured tire to the PCI device and the function for unloading the cooled tire as one application example in the embodiment. However, a loading device for loading and an unloading device for unloading may be separately being provided, and the present invention may be applied to both of or one of the device (e.g., the loading device), and the other device (e.g., the unloading device) may have the conventional structure.

It is unnecessary that the tire loading/unloading device (including the loading device and the unloading device) uses the rotating arm, and the tire may be moved to the tire set position of the tire-vulcanizing device, the tire set position of the PCI device and the tire discharging position by allowing the tire on a guide rail.

INDUSTRIAL AVAILABILITY

As explained above, according to the tire-catching device of the PCI device of the present invention, since the tire-catching device is assembled into the attaching/detaching-side rim mold, it is possible to load the tire by the loading device and to unload the tire by the unloading device in a state in which the attaching/detaching-side rim mold catches the tire.

With this, when the loading device or the unloading device is transferred; it is possible to eliminate the procedure for separating the attaching/detaching-side rim mold to separate both the rim molds, and the loading operation and the unloading operation are simplified correspondingly, and the operation efficiency can be enhanced.

Further, the stroke amount when separating or coupling the attaching/detaching-side rim mold from and to the body-side rim mold is reduced to such a degree that the grasped tire does not interfere with the body-side rim mold and thus, the device is reduced in size.

What is claimed is:

1. A post-vulcanization inflating device comprising a body-side rim mold and an attaching/detaching-side rim mold, in which both said rim molds are formed with bead receiving surfaces opposed to an outer surface of a bead portion of a post-vulcanized tire, the post-vulcanized tire is cooled and its shape is stabilized in a state in which the post-vulcanized tire is held between the bead receiving surfaces, wherein said attaching/detaching-side rim mold is provided with an engaging pawl for detachably catching the bead portion of the tire.

* * * * *